(12) United States Patent
Rupp et al.

(10) Patent No.: US 9,487,288 B2
(45) Date of Patent: Nov. 8, 2016

(54) APPARATUS AND METHODS FOR EXTENDING HYBRID LAMINAR FLOW CONTROL

(71) Applicant: The Boeing Company, Chicago, IL (US)

(72) Inventors: Peter L. Rupp, Bellevue, WA (US); Pradip G. Parikh, Renton, WA (US); Lian L. Ng, Bellevue, WA (US); Paul M. Vijgen, Everett, WA (US)

(73) Assignee: The Boeing Company, Chicago, IL (US)

( * ) Notice: Subject to any disclaimer, the term of this patent is extended or adjusted under 35 U.S.C. 154(b) by 418 days.

(21) Appl. No.: 13/909,081

(22) Filed: Jun. 4, 2013

(65) Prior Publication Data

US 2015/0083258 A1 Mar. 26, 2015

(51) Int. Cl.
*B64C 21/06* (2006.01)
*B64C 3/20* (2006.01)
*B64F 5/00* (2006.01)
*F15D 1/00* (2006.01)

(52) U.S. Cl.
CPC ............. *B64C 21/06* (2013.01); *B64C 3/20* (2013.01); *B64F 5/00* (2013.01); *F15D 1/008* (2013.01); *B64C 2230/20* (2013.01); *B64C 2230/22* (2013.01); *Y02T 50/166* (2013.01); *Y10T 137/206* (2015.04)

(58) Field of Classification Search
CPC ..... Y02T 70/121; B64C 21/06; B64C 21/00; B64C 23/00; B64C 2230/04; B64C 2230/22
USPC ...... 244/130, 133, 204, 198, 99.5, 209, 207, 244/208
See application file for complete search history.

(56) References Cited

U.S. PATENT DOCUMENTS

| | | | |
|---|---|---|---|
| 1,810,693 A | 6/1931 | Alfaro | |
| 1,829,616 A | 10/1931 | Stalker | |
| 1,957,413 A | 5/1934 | Price | |
| 2,646,945 A * | 7/1953 | Perry | B64C 21/025 244/204 |
| 2,721,715 A | 10/1955 | Hoadley | |
| 2,843,341 A | 7/1958 | Daanenberg et al. | |
| 2,873,931 A | 2/1959 | Fleischmann | |

(Continued)

FOREIGN PATENT DOCUMENTS

| | | | | |
|---|---|---|---|---|
| CA | 2775041 A1 | 4/2011 | | |
| DE | CA 2482247 A1 * | 10/2003 | ............. | B64C 21/06 |

(Continued)

OTHER PUBLICATIONS

Extended European Search Report EP14171102.8 and Written Opinion dated Oct. 13, 2014.

(Continued)

*Primary Examiner* — Benjamin P Lee
(74) *Attorney, Agent, or Firm* — McDonnell Boehnen Hulbert & Berghoff LLP

(57) ABSTRACT

Systems and methods for secondary suctioning for an aerodynamic body are presented. A primary surface is configured along a leading edge of an aerodynamic body, and at least one secondary suction device comprising an elongated shape is configured at least a first distance from the primary surface. A non-suction surface is configured between the primary surface and the at least one secondary suction device.

20 Claims, 13 Drawing Sheets

(56) References Cited

U.S. PATENT DOCUMENTS

| | | | |
|---|---|---|---|
| 3,128,973 A | | 4/1964 | Damaenberg et al. |
| 3,203,648 A | | 8/1965 | Vanesian et al. |
| 3,261,576 A | | 7/1966 | Valyi et al. |
| 3,317,162 A | | 5/1967 | Grant |
| 3,332,644 A | | 7/1967 | Whittley |
| 3,421,577 A | | 1/1969 | Valyi et al. |
| 4,102,499 A | | 7/1978 | Hall |
| 4,418,879 A | | 12/1983 | Vanderleest |
| 4,477,040 A | | 10/1984 | Karanik |
| 4,575,030 A | | 3/1986 | Gratzer |
| 4,749,150 A | | 6/1988 | Rose et al. |
| 4,836,473 A | | 6/1989 | Aulehla et al. |
| 5,263,667 A | * | 11/1993 | Horstman .............. B64C 21/06 244/130 |
| 5,316,032 A | * | 5/1994 | DeCoux ................. B64C 21/06 137/14 |
| 5,354,015 A | | 10/1994 | Meador |
| 5,366,177 A | | 11/1994 | DeCoux |
| 5,779,196 A | | 7/1998 | Timar |
| 5,813,625 A | | 9/1998 | Hassan et al. |
| 5,848,768 A | | 12/1998 | Seyfang |
| 5,899,416 A | | 5/1999 | Meister et al. |
| 6,068,328 A | | 5/2000 | Gazdzinski |
| 6,349,899 B1 | | 2/2002 | Ralston |
| 6,565,035 B1 | | 5/2003 | Kim et al. |
| 6,634,597 B2 | | 10/2003 | Johnson et al. |
| 6,752,358 B1 | * | 6/2004 | Williams ................. B64C 1/12 244/208 |
| 7,048,230 B2 | * | 5/2006 | Meyer ................... B64D 33/02 244/130 |
| 7,152,829 B2 | * | 12/2006 | Bertolotti .............. B64C 21/06 244/209 |
| 7,832,689 B2 | | 11/2010 | Prince et al. |
| 7,866,609 B2 | | 1/2011 | Parikh |
| 7,922,126 B2 | | 4/2011 | Meister |
| 8,245,976 B2 | | 8/2012 | Sakurai et al. |
| 8,282,042 B2 | | 10/2012 | Parikh et al. |
| 8,800,915 B2 | * | 8/2014 | Gerber ................... B64C 21/06 244/123.1 |
| 2002/0166923 A1 | | 11/2002 | Munoz |
| 2005/0178924 A1 | | 8/2005 | Bertolotti |
| 2006/0102776 A1 | | 5/2006 | Hein |
| 2007/0221788 A1 | | 9/2007 | Meister |
| 2008/0099631 A1 | | 5/2008 | Parikh |
| 2010/0116943 A1 | | 5/2010 | Meister |
| 2010/0181435 A1 | | 7/2010 | Sakurai et al. |
| 2012/0037760 A1 | | 2/2012 | Koppelman |
| 2013/0025727 A1 | | 1/2013 | Gerber et al. |
| 2015/0083866 A1 | * | 3/2015 | Biedscheid ............. B64C 21/04 244/208 |

FOREIGN PATENT DOCUMENTS

| | | | | |
|---|---|---|---|---|
| EP | 2418147 A2 | | 2/2012 | |
| GB | 713426 | | 8/1954 | |
| GB | 713426 A | * | 8/1954 | ............. B64C 21/06 |
| GB | 2402196 A | * | 12/2004 | ............. B64D 33/02 |

OTHER PUBLICATIONS

Examination Search Report issued in Canadian Patent Application No. 2852243 dated Apr. 27, 2015.

communication Pursuant to Article 94(3) EPC issued in European Patent Application No. 14171102.8 dated Apr. 19, 2016.

Office Action issued in Canadian Patent Application No. 2,842,243 dated Mar. 15, 2016.

* cited by examiner

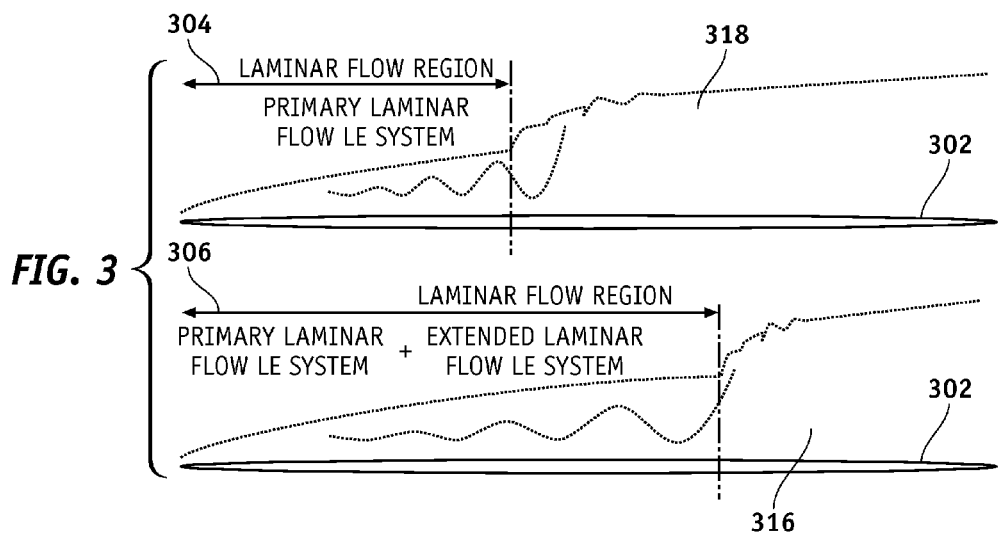
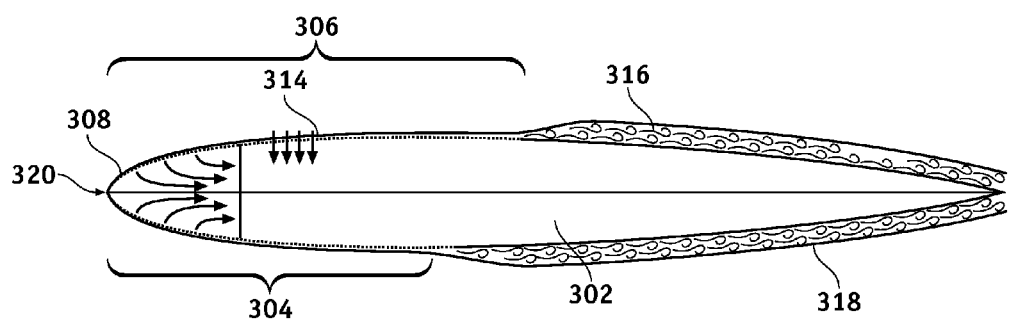

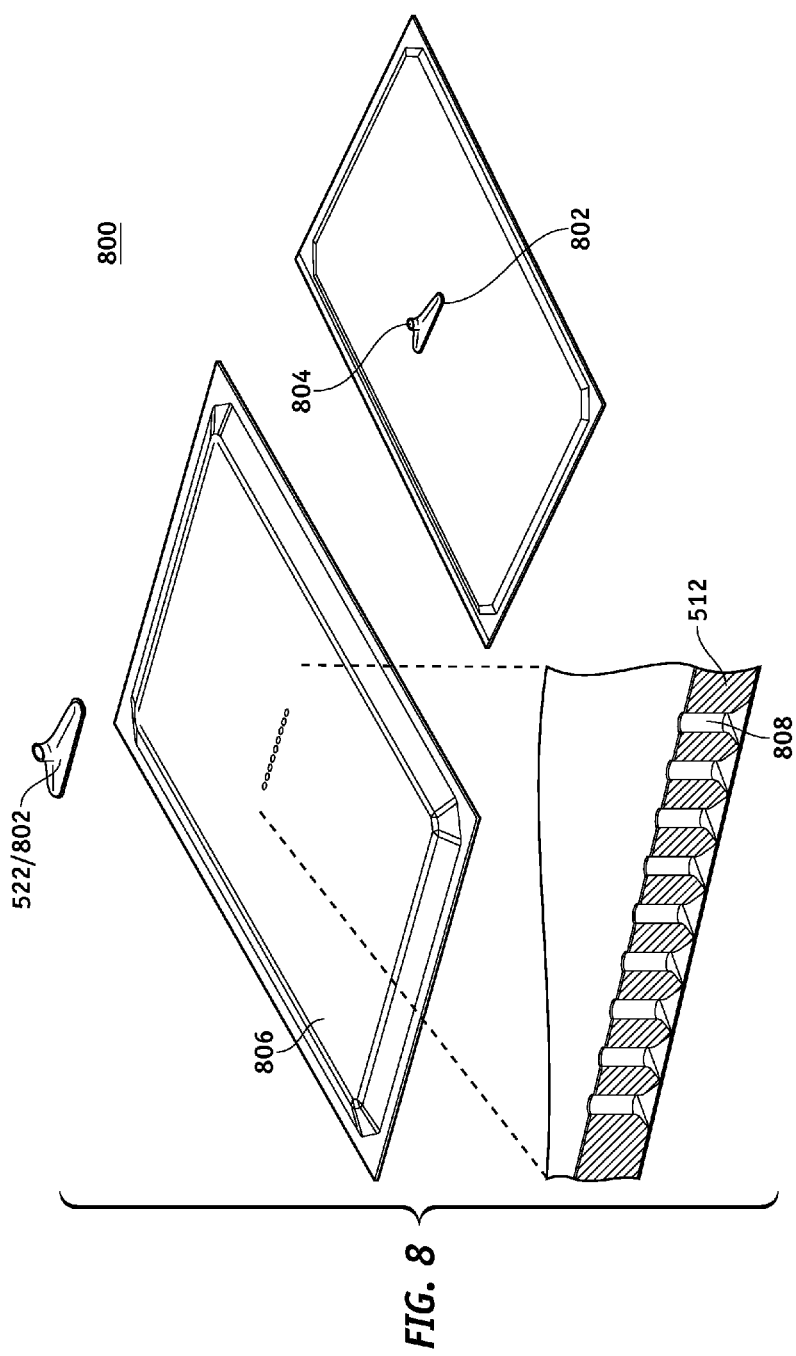

APPARATUS AND METHODS FOR EXTENDING HYBRID LAMINAR FLOW CONTROL

FIELD

Embodiments of the present disclosure relate generally to aerodynamic surfaces. More particularly, embodiments of the present disclosure relate to aerodynamic surfaces providing laminar flow.

BACKGROUND

Laminar flow may comprise, for example but without limitation, a flow of air in a boundary layer over a contour of parts of an aircraft such as wings, fuselage, and the like. The term boundary layer refers to a thin layer of air that forms next to a surface of an aircraft in motion, wherein a velocity of the air relative to the aircraft changes rapidly from zero at the surface to a local external velocity. The air flow within the boundary layer can be smooth as in a laminar state, or chaotic as in a turbulent state, or a transitional state wherein the air flow is intermittently laminar or turbulent. The transition from laminar to turbulent state of the boundary layer is induced by either gradual growth of natural flow instability or an abrupt disturbance caused by surface protuberances. From a perspective of minimizing viscous drag on the aircraft moving through air, it is desirable to establish and prolong as much as possible a laminar state of the boundary layer on a surface of the aircraft. Controlling growth of natural instability in a laminar boundary layer as well as minimizing surface protuberances can prolong the laminar state of the boundary layer in order to minimize viscous drag on the aircraft.

A smooth surface of an aerodynamic body designed to prolong laminar boundary layer flow for reducing viscous drag may be called a laminar flow surface. A laminar flow aerodynamic surface may prolong (extend) laminar boundary layer flow by modifying a contour of the laminar flow aerodynamic surface. However, such contouring of the laminar flow aerodynamic surface may not always be possible due to structural constraints and possible adverse impacts on other components of aerodynamic drag.

SUMMARY

A suctioning system and method is presented. A primary surface is configured along a leading edge of an aerodynamic body, and a secondary suction device comprising an elongated shape is configured at least a first distance from the primary surface. A non-suction surface is configured between the primary surface and the secondary suction device.

A thin perforated face-sheet integrates with bonded enclosed suction cells into structural skin panels in a weight efficient manner. In this manner, laminar flow is promoted over a greater region of an airfoil (cross section of an aerodynamic surface) thereby reducing drag under certain operating conditions. Laminar flow is promoted and extended along an airfoil surface beyond a region established from a hybrid or natural laminar flow leading edge system. An extent of laminar flow of a natural passive system or a hybrid active laminar flow system is increased by an efficient integrated secondary suction device.

In an embodiment, a suctioning system comprises a surface skin facesheet, a channeled stiffener, a structural core layer, an interior backing facesheet, and a suction device. The surface skin facesheet comprising a plurality of perforations configured to allow a flow of a fluid. The channel stiffener comprises suction channels and is coupled to the surface skin facesheet and is configured to structurally support the surface skin facesheet and channel the flow of the fluid through the surface skin facesheet. The structural core layer is coupled to and configured to structurally support a portion of the surface skin facesheet and the channeled stiffener. The interior backing facesheet is coupled to and is configured to structurally support the structural core layer. The suction device is configured to draw the fluid from the channeled stiffener.

In another embodiment, a suctioning system for suction over an aerodynamic surface comprises a sandwich panel, a perforated region, and a channeled stiffener. The sandwich panel comprises a structural core layer, a surface skin facesheet, and an interior backing facesheet. The perforated region where a portion of the surface skin facesheet is perforated. The channeled stiffener comprises suction cavities located within the structural core layer and in fluid communication with the perforated region, the channeled stiffener is adapted for coupling to a flow sink.

In a further embodiment, a method for secondary suctioning for an aerodynamic body configures a primary surface along a leading edge of an aerodynamic body. The method further, configures at least one secondary suction device comprising an elongated shape at least a first distance from the primary surface, and configures a non-suction surface between the primary surface and the at least one secondary suction device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

FIG. 3 is an illustration of a baseline and a hybrid laminar flow control and an extended hybrid laminar flow control using an extended (secondary) suction device according to an embodiment of the disclosure.

FIGS. 3A-3C are illustrations showing aspects of an extended hybrid laminar flow control process according to an embodiment of the disclosure.

FIG. 8 is an illustration of a back side of a secondary laminar flow control panel with a sandwich panel manifold integration according to an embodiment of the disclosure.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to fluid dynamics, structures, manufacturing, and other functional aspects of the systems (and the individual operating components of the systems) may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of practical non-limiting applications, namely, an aircraft airfoil surface. Embodiments of the disclosure, however, are not limited to such applications, and the techniques described herein may also be utilized in other fluid dynamic surface applications. For example, embodiments may be applicable to wind turbine blades, hydrodynamic surfaces utilizing liquid (e.g., water) instead of air, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
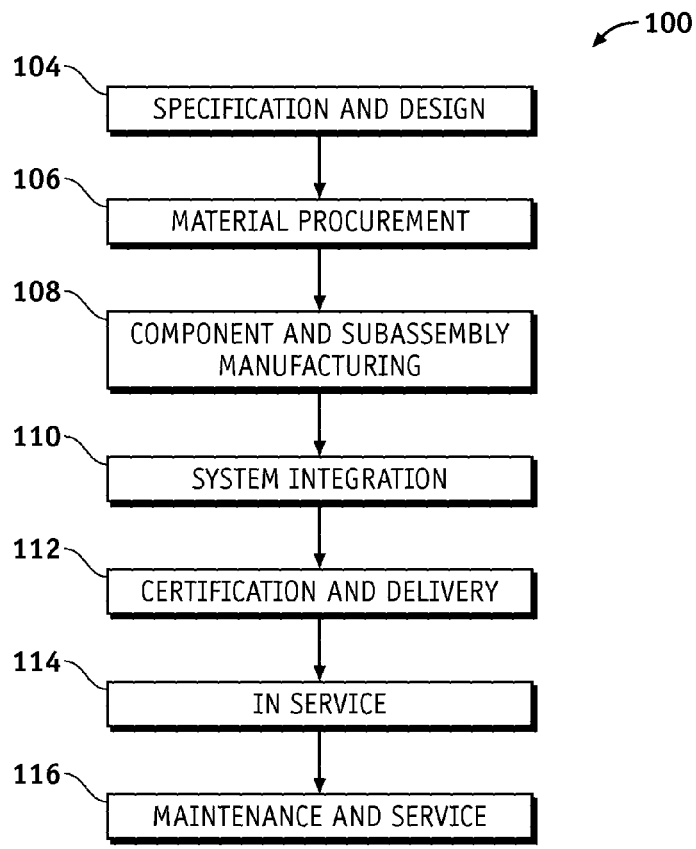
FIG. 1 is an illustration of a flow diagram of an exemplary aircraft production and service methodology.
Figure 2:
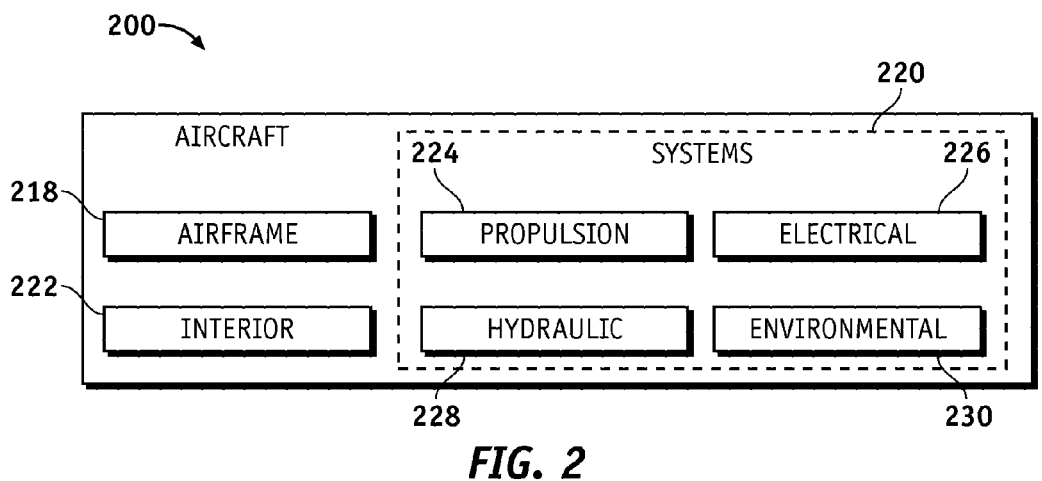
FIG. 2 is an illustration of an exemplary block diagram of an aircraft.

Referring more particularly to the drawings, embodiments of the disclosure may be described in the context of an aircraft manufacturing and service method 100 as shown in FIG. 1 and an aircraft 200 as shown in FIG. 2. During pre-production, the exemplary method 100 may include specification and design 104 of the aircraft 200 and material procurement 106. During production, component and sub-assembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be without limitation an airline, leasing company, non-civilian entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, and an environmental system 230. Any number of other systems may also be included. Although an aerospace example is shown, the embodiments of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. In addition, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

As mentioned above, a laminar flow aerodynamic surface may prolong (extend) laminar boundary layer flow by modifying the contour of the aerodynamic surface. However, such contouring of the aerodynamic surface may not always be possible due to structural constraints and possible adverse impacts on other components of aerodynamic drag. An alternative approach is to apply a small amount of boundary layer suction through the aerodynamic surface in order to suppress or reduce growth of instability in the laminar boundary layer, thereby providing a laminar flow aerodynamic surface. This boundary layer control can be employed with or without aerodynamic surface contour modifications.

Since some implementation of boundary layer suction to prolong laminar flow incurs structural penalties as well as weight and drag penalties of its own, it is important to minimize both the amount of suction as well as the extent of suction region over the laminar flow surface, so that a net benefit in terms of viscous drag reduction can be realized. The embodiments relate to 1) an aerodynamic/fluid dynamic method to minimize both the amount of suction mass flow rate as well as an extent of a suction region over the laminar flow aerodynamic surface to achieve a significant extension of laminar flow, and 2) efficient and light weight means of integrating a secondary suction device and associated suction flow collection hardware (e.g., flow sink) into the aircraft 200 structure as explained in more detail below.

Embodiments of the disclosure promote laminar flow over a greater region of an airfoil thereby reducing drag under certain operating conditions. Embodiments of the disclosure promote the laminar flow along an airfoil surface beyond a primary laminar flow region established from a hybrid or natural laminar flow leading edge system. Embodiments of the disclosure comprise an addition of an extended or a secondary suction device aft of a leading edge of an airfoil to extend a secondary laminar flow along the airfoil beyond the primary laminar flow region. The extended suction device is bonded into structural panels of a vehicle such as the aircraft 200 in a weight efficient manner.

A surface finish/paint method using a blow-back technique may be applied to maintain desired permeability and smoothness of a perforated face-sheet of the extended suction device. The extended suction device may be coupled to an existing primary hybrid laminar flow control purge and suction system or may comprise a dedicated passive suction device to any suitable suction, or suction and purge source such as a scoop or scupper or other flow sink as explained in more detail below. The perforated face-sheet comprises thin metal, composite, or other suitable material with bonded enclosed suction channels into existing structural skin panels of a vehicle in a weight efficient manner.

Figure 3B:
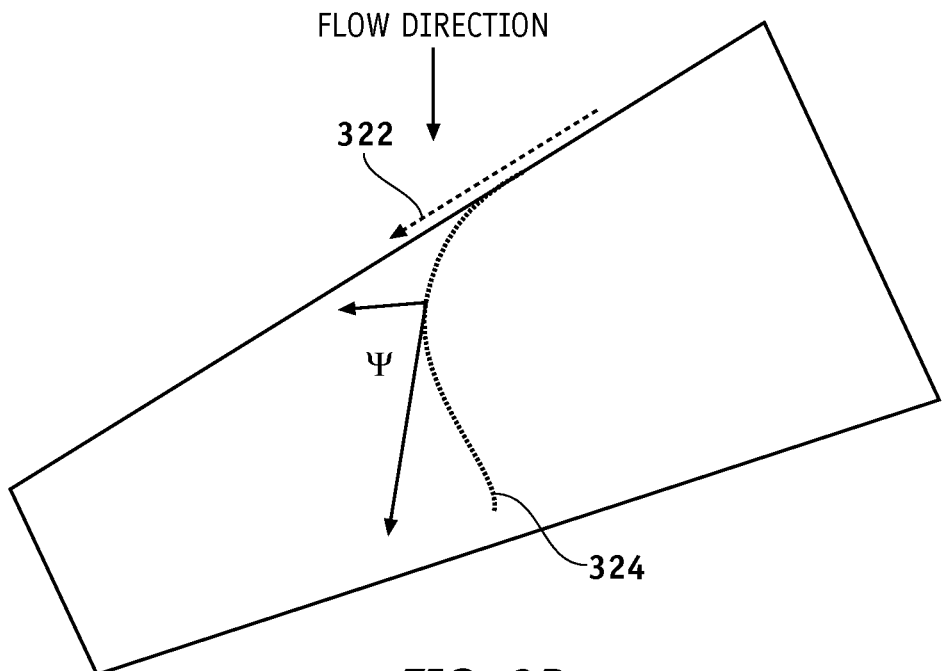
Figure 3C:
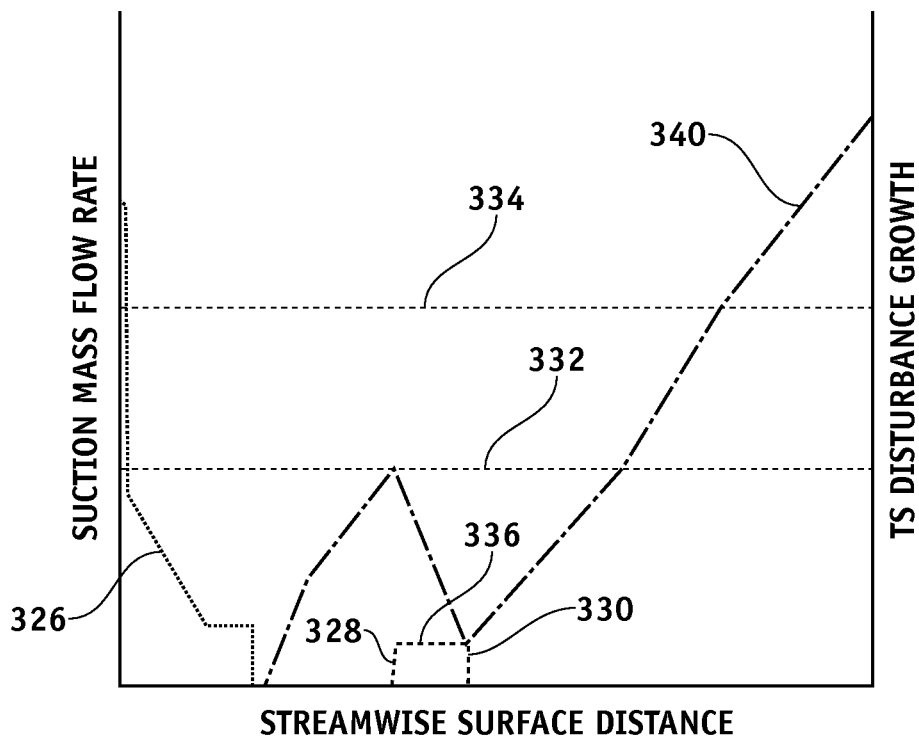

FIG. 3 is an illustration of a baseline and hybrid laminar flow control and an extended hybrid laminar flow control using an extended (secondary) suction device according to an embodiment of the disclosure. FIGS. 3A-3C are illustrations showing aspects of an extended hybrid laminar flow control process according to an embodiment of the disclosure. Laminar-turbulent transition on a swept wing is generally caused by attachment line instability or contamination, cross flow (CF) disturbances, or Tollmien-Schlichting (TS) disturbances comprising laminar boundary layer disturbances.

FIG. 3B shows a sketch of a swept wing with a representative inviscid streamline 324, a propagation direction of an attachment line disturbances 322, and a propagation wave angle $\phi$, measured from the inviscid streamline 324 of the cross flow (CF) disturbances or the Tollmien-Schlichting (TS) disturbances. The propagation wave angle $\phi$ of the cross flow (CF) disturbances may be about 90 degrees, whereas the propagation wave angle $\phi$ of the Tollmien-Schlichting (TS) disturbances may be less than 70 degrees. FIG. 3C shows suction mass flow rate versus streamwise surface distance.

A primary laminar flow leading edge surface 308 (primary laminar flow surface 308, FIG. 3A) is configured to provide a laminar attachment-line boundary layer in a leading edge (LE) region and to control mainly cross-flow (CF) disturbance growth, for example by providing a primary suction mass flow rate 326 (FIG. 3C). Application of suction over the primary laminar flow surface 308 establishes a primary suction region 304. The application of suction over the primary laminar flow surface 308 maintains laminar flow over the primary suction region 304, which extends not only over the primary laminar flow surface 308, but also some distance beyond a point where the suction is terminated.

This combination of suction controlled and natural laminar flow is called hybrid laminar flow. Growth of instability in the laminar boundary layer beyond the leading edge suction region eventually leads to transition to a turbulent state. In some embodiments, growth of instability in the boundary layer is suppressed or reduced by configuring a secondary/extended suction device 314 (FIG. 3A) at least a first distance from the primary laminar flow surface 308. No suction is applied between the primary laminar flow surface 308 and the secondary suction device 314.

The extended suction device 314 may be located aft of the primary laminar flow surface 308. Also, the extended suction device 314 may be configured to mainly control a Tollmien-Schlichting (TS) disturbance growth 340 (FIG. 3C) by providing a secondary suction mass flow rate 336 (rate of mass flow per unit time) according to embodiments of the disclosure. The extended suction device 314 can potentially be applied to suppress the cross flow (CF) disturbance growth or laminar-flow boundary-layer separation as well. The extended suction device 314 can be optimized by spacing of perforations 516 (see FIG. 5) of the extended suction device 314 and an amount of the secondary suction mass flow rate 336 to excite controlled cross flow (CF) disturbances that may lead to a delay in transition to a turbulent state. The extended suction device 314 not only reduces the overall suction required to achieve a significant extension of laminar flow, it also makes it easier to integrate the extended suction device 314 and associated suction flow collection hardware (e.g., flow sink) into the structure of the aircraft 200 with minimal interference with components of the internal structure of the aircraft 200.

The extended suction device 314 may begin at a starting location 328 when the Tollmien-Schlichting disturbance growth 340 reaches an amplitude threshold value 332 (FIG. 3C). The extended suction device 314 delays a location of the transition to the turbulent state where a transition Tollmien-Schlichting disturbance value 334 is reached by suppressing the Tollmien-Schlichting disturbance growth 340. An amount of suction necessary to control the Tollmien-Schlichting disturbance growth 340 is typically much less than that for controlling the cross flow (CF) disturbance growth.

As shown in FIG. 3A, the primary laminar flow surface 308 yields a primary laminar flow region 304 (interchangeably referred to herein as primary suction region 304). The extended suction device 314 may be located within the primary laminar flow region 304. The extended suction device 314 extends a laminar flow along an airfoil surface 302 (fluid dynamic surface 302) beyond the primary suction region 304 established from the primary laminar flow surface 308 to form an extended laminar flow region 306 (interchangeably referred to herein as secondary suction region 306) in an efficient manner to achieve a decreased drag reduction benefit. In this manner, the extended suction device 314 forms the secondary suction region 306 of the airfoil surface 302 along a span-wise direction 416 (FIG. 4) of the airfoil surface 302, the secondary suction region 306 extending beyond the primary suction region 304 of the airfoil surface 302 along the span-wise direction of the airfoil surface 302.

In the example shown in FIG. 3A, an upper turbulent boundary layer flow 316 is reduced due to suction provided by the extended suction device 314 located on an upper surface of the airfoil surface 302. Also, in this example, lower turbulent boundary layer flow 318 is not reduced since an extended suction device 314 is not located on a lower surface of the airfoil surface 302.

Extended suction device and secondary suction device may be used interchangeably in this document. Similarly, a primary laminar flow surface, a primary surface, and a primary laminar flow leading edge surface may be used interchangeably in this document.

Figure 4:
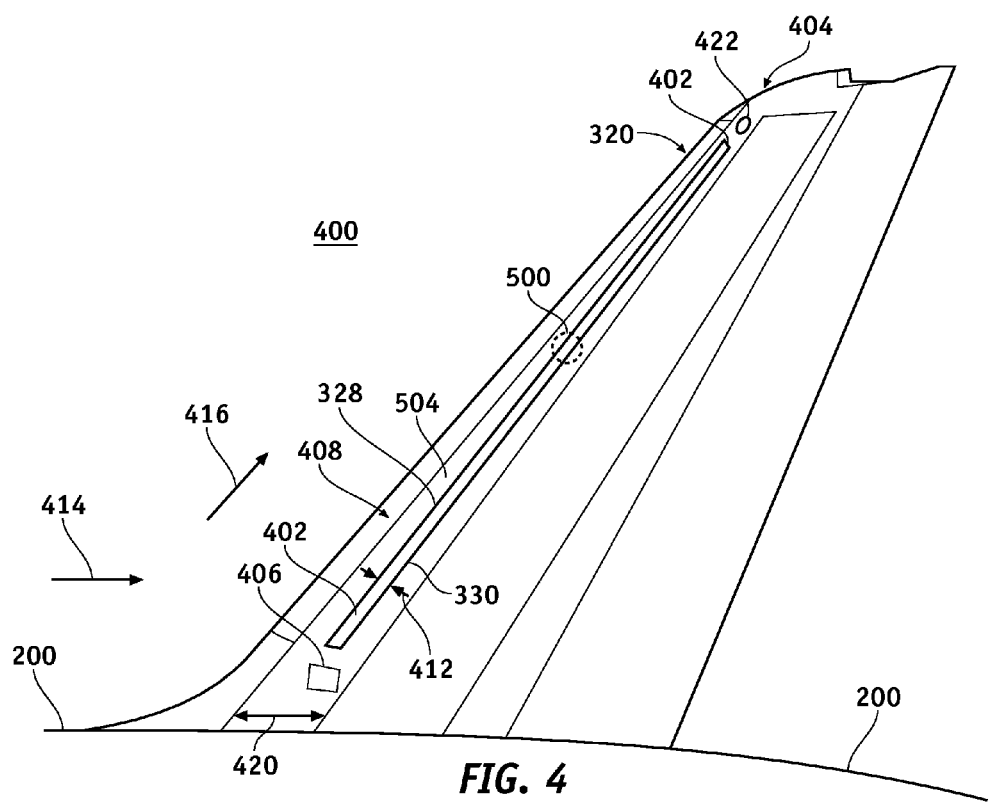
FIG. 4 is an illustration of a vertical fin showing an extended suction device integrated into structural sandwich panels thereof according to an embodiment of the disclosure.

FIG. 4 is an illustration of a fin 400 (e.g., a vertical fin or a horizontal stabilizer) showing an extended (secondary) suction device 402 (314 in FIG. 3A) integrated into structural sandwich panels 404 thereof according to an embodiment of the disclosure. The fin 400 is used herein as an example of an aircraft exterior surface, an aircraft surface, an airfoil surface, an aerodynamic surface/body or a fluid dynamic surface/body. However, other fluid dynamic lifting surfaces and/or control surfaces, such as but without limitation, a horizontal stabilizer, a wing, a winglet, a canard, a fuselage skin, an elevator, an aileron, an elevon, a rudder, a flap, a slat, a spoiler, or a combination thereof may also be used.

As mentioned above, the primary laminar flow surface 408 (308 in FIG. 3A) is configured to provide a leading edge laminar boundary layer and to mainly control the cross-flow (CF) disturbance growth. The primary laminar flow surface 408 may be configured for either hybrid laminar flow or natural laminar flow operation. The primary laminar flow surface 408 configured for hybrid laminar flow comprises a combination of suction controlled and natural laminar flow yielding the primary suction region 304. The primary laminar flow surface 408 configured for natural laminar flow operation yields a primary natural laminar flow region.

The primary laminar flow surface 408 may be located, for example but without limitation, at an about 7% chord line of the vertical fin 400 relative to the leading edge 320 of the vertical fin 400, or other location on the vertical fin 400.

The secondary suction device 402 may comprise an elongated shape, such as but without limitation, an elongated trapezoidal shape, an elongated rectangular shape, a shape strip-like in nature, a shape span-wise and tapering in nature, a shape span-wise and non-tapering in nature, a shape span-wise and near constant width, or other elongated shape. The secondary suction device 402 may be located a distance aft of the primary laminar flow surface 408 such as aft of the leading edge 320 of the vertical fin 400.

The secondary suction device 402 may be located, for example but without limitation, in forward box panel of the vertical fin 400 starting at about 14% to about 18% of a chord line of the vertical fin 400 from the leading edge 320 of the vertical fin 400, or other location on the vertical fin 400. In this example, the secondary suction mass flow rate 336 (FIG. 3C) provided by the extended suction device 402 may be about 10%-20% of the primary suction mass flow rate 326 provided by the primary laminar flow surface 408.

The laminar flow region 304 (FIG. 3) may be increased by about 50-60% to provide the extended laminar flow region 306.

Figure 11:
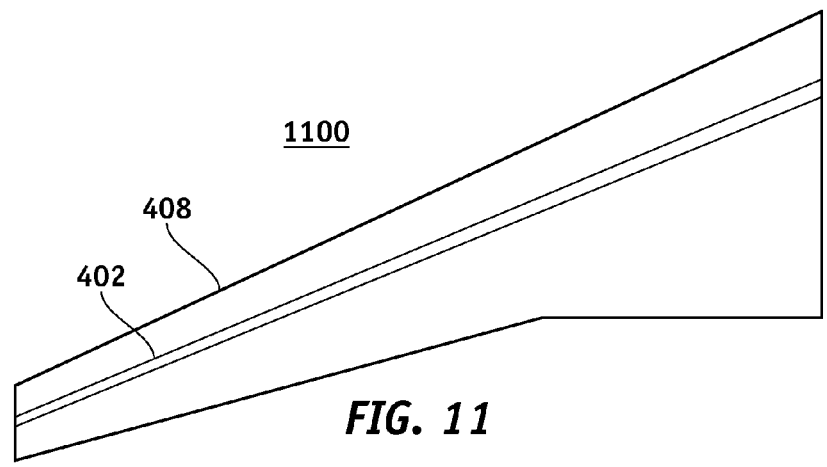
FIG. 11 is an illustration of a small size wing showing an extended laminar flow control suction strip integrated aft of a leading edge of an aerodynamic surface into structural sandwich panels thereof according to an embodiment of the disclosure.
Figure 12:
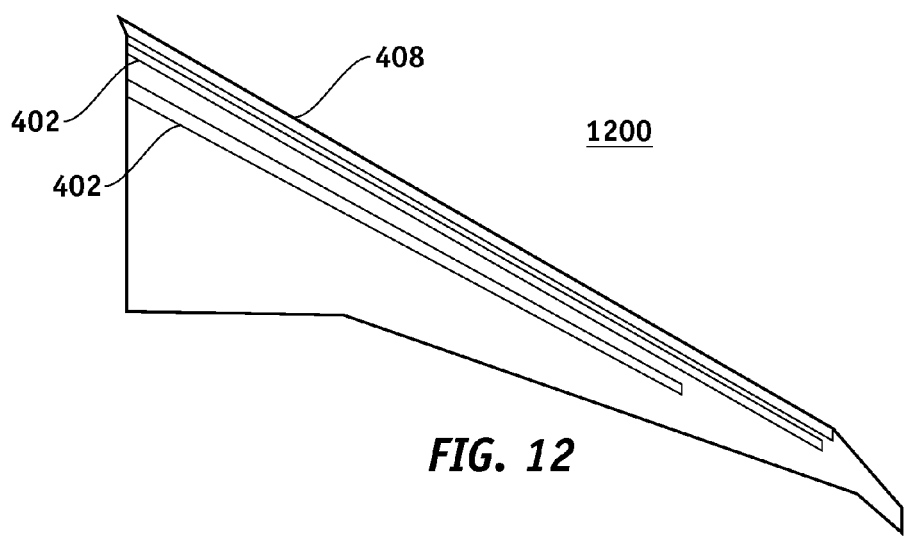
FIG. 12 is an illustration of a large size wing showing multiple extended suction device integrated aft of a leading edge of an aerodynamic surface into structural sandwich panels thereof according to an embodiment of the disclosure.
Figure 13:
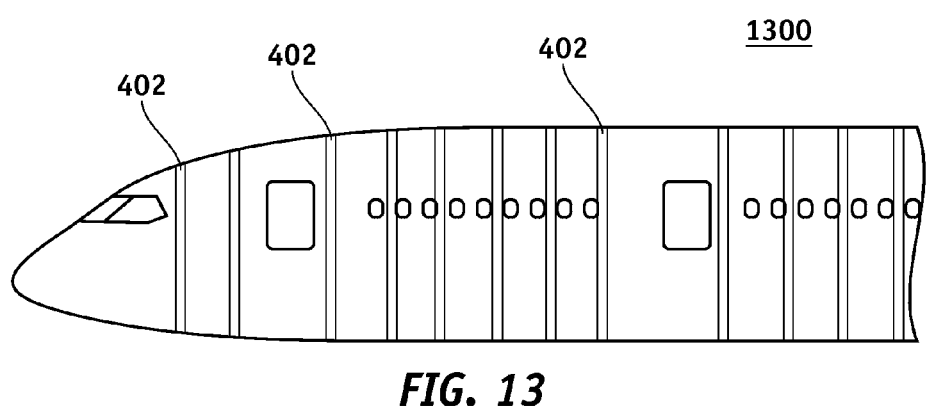
FIG. 13 is an illustration of a fuselage showing multiple extended suction devices integrated into structural sandwich panels of the fuselage according to an embodiment of the disclosure.

The starting location 328, an ending location 330, and thus a width 412 of the extended suction device 402 depends on an airfoil shape of the fluid dynamic surface 302 and on flight conditions. Multiple extended suction devices 402 may also be used if it is determined to be feasible and beneficial. FIGS. 11-13 show an extended (secondary) suction device 402 integrated into structural panels of various fluid dynamic surfaces according to various embodiment of the disclosure.

The secondary suction device 402 is joined into the structural sandwich panels 404 in a weight efficient manner. A non-suction surface such as a surface skin facesheet 504 is located between the primary laminar flow surface 408 and the secondary suction device 402. In some examples, at least a portion of the secondary suction device 402 comprises perforations 516 (FIG. 5) beginning in a region proximate to where a laminar boundary layer is experiencing an increased laminar boundary layer disturbance growth such as an increased Tollmien-Schlichting disturbance growth 340 and continuing in a stream-wise direction 414 while extending in a lateral or span-wise direction 416.

A blow-back technique for reverse blowing air out of the secondary suction device 402 during painting of the secondary suction device 402 (FIG. 9) is applied to maintain permeability and smoothness of the secondary suction device 402, thus achieving a desired surface finish. The secondary suction device 402 is purged with air, or a suitable gas, during painting or coating to mitigate accumulation of paint and flow restriction of the perforations 516 thereof.

The secondary suction device 402 may be coupled to an existing primary hybrid laminar flow control purge and suction system, or may comprise a dedicated passive suction device configured to direct the fluid suctioned by the secondary suction device 402 out to a low pressure source that removes/evacuates the suctioned fluid. The dedicated passive suction device thus communicates with the low pressure source to direct the suctioned fluid out to the low pressure source, for example, out over the fluid dynamic surface 302.

The dedicated passive suction device may comprise, for example but without limitation, a low pressure suction port 406/422 (suction port 406/422, passive suction source 406/422, flow sink 406/422) shared between the primary suction region 304 (FIG. 3) and the secondary suction device 402. The dedicated passive suction device may also comprise, for example but without limitation, a surface opening conformed to a contour of the fluid dynamic surface 302, a protrusion on the fluid dynamic surface 302 such an aft-facing-scupper passive suction source 1402 (FIGS. 14-16), a flow sink on the fluid dynamic surface 302 such as a scoop having a backward facing exit opening on the aerodynamic body, or other dedicated passive suction device. The low pressure source, may comprise, for example but without limitation, a low pressure region over the fluid dynamic surface 302, or other low pressure flow removal source.

The aft-facing-scupper passive suction source 1402 (FIGS. 14-16) for low-pressure is configured to provide an aft-facing passive suction for the fluid suctioned by the secondary suction device 402 and collected in the suction channels 514 of the channeled stiffeners 512. The aft-facing-scupper passive suction source 1402 (passive suction device 1402) is directly coupled (as opposed to connected via internal manifolding to a remotely located suction source) to a surface skin facesheet 504 of a suctioning system 500 (FIG. 5).

In this manner, the aft-scupper passive suction source 1402 provides a self-contained source for low-pressure to service a panel/facesheet of certain size. The aft-facing-scupper passive suction source 1402 eliminates a need to couple the surface skin facesheet 504, and the interior backing facesheet 506 of the suctioning system 500 pneumatically to a low-pressure suction source such as the low-pressure suction source 406, reducing weight and facilitating retrofit of existing panels. The aft-facing-scupper passive suction source 1402 is explained in more detail in the context of discussion of FIGS. 14-16 below.

The scoop comprising a backward facing exit opening is configured to provide a passive suction to direct the fluid suctioned by the secondary suction device 402 out to a low pressure source such as a low pressure region on the fluid dynamic surface 302 that removes the suctioned fluid collected in the suction channels 514. The scoop is described in more detail in the U.S. Pat. No. 7,866,609 content of which is incorporated by reference herein in its entirety.

Figure 5:
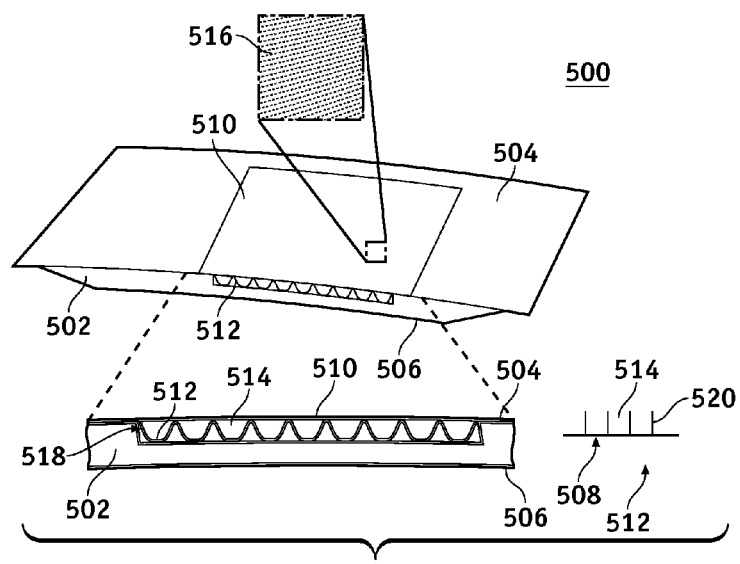
FIG. 5 is an illustration of an expanded view of an integrated laminar flow suctioning system of the vertical fin of FIG. 4 showing a portion of the secondary suction device of FIG. 4 integrated into the structural sandwich panels according to an embodiment of the disclosure.

FIG. 5 is an illustration of an expanded view of the suctioning system 500 (system 500) of the fin 400 showing a portion of the secondary suction device 402 integrated into structural sandwich panels 404 according to an embodiment of the disclosure. The structural sandwich panels 404 of system 500 comprise a structural core layer 502, the surface skin facesheet 504, the interior backing facesheet 506, and channeled stiffeners 512.

The surface skin facesheet 504 comprises a perforated region 510 where a portion of the surface skin facesheet 504 is perforated via the perforations 516. The perforations 516 may comprise a substantially strip-like portion of the airfoil surface 302/vertical fin 400 along the span-wise direction 416 thereof. The surface skin facesheet 504 may be spaced a distance at least equal to a chord width 420 (FIG. 4) of the surface skin facesheet 504 from the leading edge 320 of the airfoil surface 302.

As mentioned above, the extended suction device 402 may be optimized by spacing of the perforations 516 and the amount of the secondary suction mass flow rate 336 to excite controlled cross flow (CF) disturbances that might lead to the delay in the transition to the turbulent state. The spacing of perforations 516 may be determined by, for example but without limitation, centers of the perforations 516, open suction area needed by the perforations 516, number of the perforations 516 per unit area, and/or other measure.

In some configurations, the surface skin facesheet 504 may be located at least a distance from the primary suction region 304, where a Tollmien-Schlichting disturbance growth 340 reaches an amplitude threshold value 332. The surface skin facesheet 504 conforms to an aircraft surface such as the airfoil surface 302/vertical fin 400 and is configured to function as a fluid dynamic surface 302 such as to allow a fluid flow of a fluid through the surface skin facesheet 504. The perforated region 510, may comprise, for example but without limitation, Titanium, Aluminum, composite, a metal alloy, a fiber reinforced polymer, or other material with a width selected based on an amount of flow needed for suction.

The channeled stiffeners 512 are coupled to the surface skin facesheet 504 within the structural core layer 502 and are configured to structurally support the surface skin facesheet 504 and channel a flow of the fluid through the surface skin facesheet 504. The channeled stiffeners 512 comprise suction cells 514. The suction cells 514 of the channeled stiffeners 512 are in fluid communication with the perforated region 510. The channeled stiffeners 512 are adapted for coupling to a flow sink/suction device for promoting laminar flow over the aerodynamic surface such as the vertical fin 400 (FIG. 4). Each of the channeled stiffeners 512 encloses a volume and may comprise, for example but without limitation, an undulating profile 518, a plurality of ribs 520 joined to a base 508, and/or other profile. Suction channels, suction cavities, and suction cells may be used interchangeably in this document.

The suction channels 514 (suction cells 514) are formed by the channeled stiffeners 512. The channeled stiffeners 512 are bonded to the surface skin face-sheet 504 and may be bonded to the surface skin face-sheets 504 and the interior backing face-sheet 506 without the structural core layer 502. The channeled stiffeners 512 are enclosed by the surface skin face-sheets 504 and the interior backing face-sheet 506, and integrated into a structural skin panel such as the structural sandwich panel 404 in a weight efficient manner. The channeled stiffeners 512 may comprise, for example but without limitation, graphite, glass fiber epoxy, metal alloy, fiber reinforced polymer, or other similar material.

The structural core layer 502, if included, is coupled to and configured to structurally support a portion of the surface skin facesheet 504 and the channeled stiffeners 512. In such example, the interior backing facesheet 506 is coupled to and is configured to structurally support the structural core layer 502.

Figure 6:
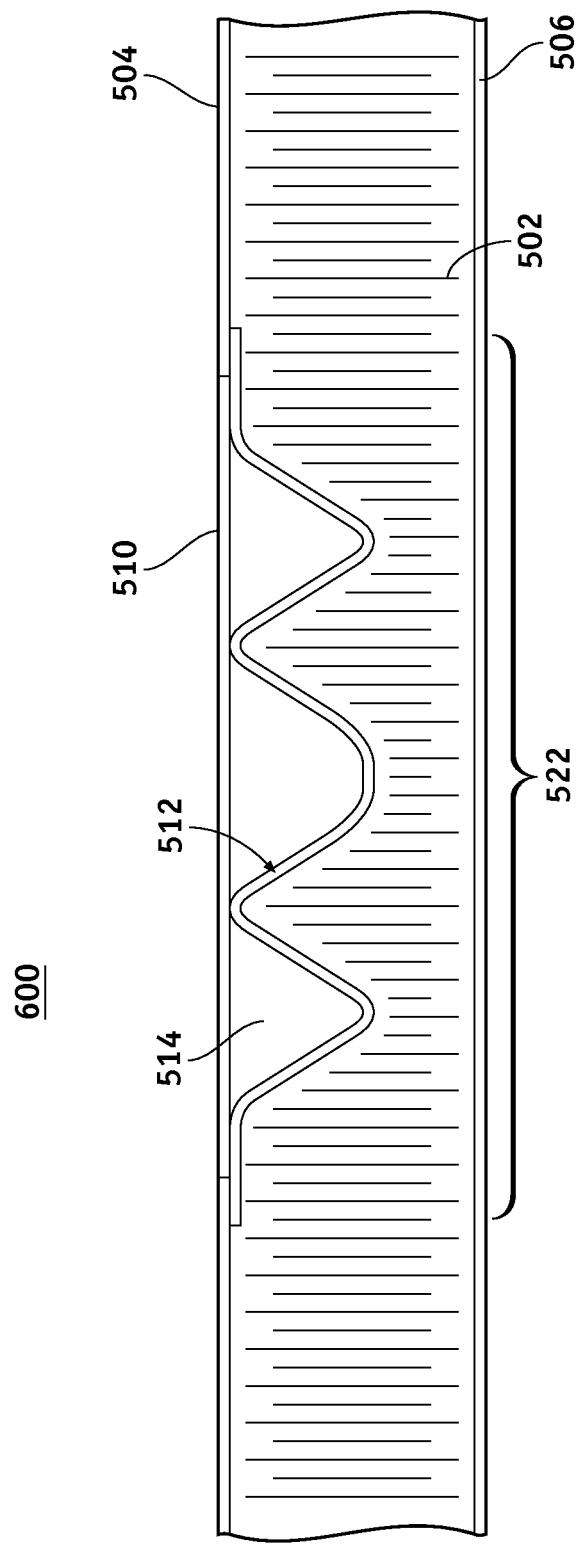
FIG. 6 is an illustration of a cross section of an integrated laminar flow suctioning system showing face-sheets with bonded enclosed channeled stiffener into structural skin panels according to an embodiment of the disclosure.

FIG. 6 is an illustration of a cross section 600 of the system 500 showing the structural core layer 502, the surface skin facesheet 504, the interior backing facesheet 506, the channeled stiffeners 512, the perforated region 510, and a manifold 522. The surface skin face-sheets 504 and the interior backing face-sheet 506 may comprise metal, metal alloy or fiber reinforced polymer with bonded enclosed channeled stiffeners 512 integrated into the structural sandwich panel 404.

The manifold 522 suitably couples the interior backing facesheet 506 to an existing hybrid laminar flow purge and suction system or to a dedicated passive suction device as explained above. The manifold 522 is explained in more detail in the context of discussion of manifold 802 in FIG. 8 below.

Figure 7:
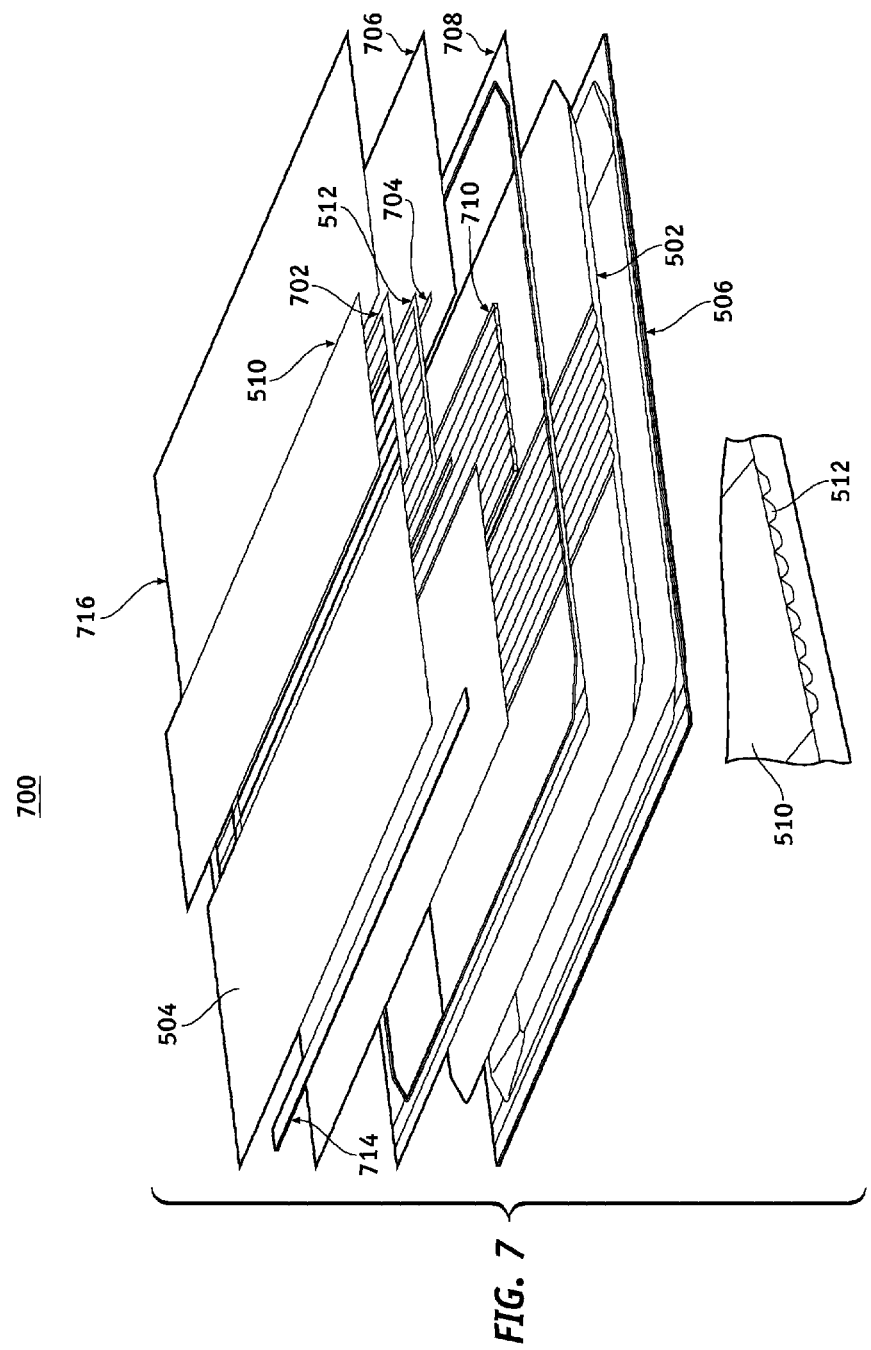
FIG. 7 is an illustration of a structural sandwich panel assembly according to an embodiment of the disclosure.

FIG. 7 is an illustration of structural sandwich panel assembly 700 for the structural sandwich panel 404 according to an embodiment of the disclosure. The structural sandwich panel assembly 700 may comprise the structural core layer 502, the surface skin facesheet 504, the interior backing facesheet 506, the perforated region 510, the channeled stiffeners 512, an adhesive ply 702, an adhesive ply 704 (e.g., glass fiber to Titanium), plies 706, plies 708, an adhesive ply 710, a syntactic core 714, and plies 716.

The adhesive ply 702 couples the channeled stiffeners 512 to the perforated region 510 (e.g., Titanium).

The adhesive ply 704, in this configuration, provides a structural bond between the perforated region 510 and the fiberglass plies 706 (plies 706) at edges of structural sandwich panel 700 that do not directly interface with the channeled stiffener 512.

The plies 706 are butted to the channeled stiffener 512.

The plies 708 are located over the channeled stiffener 512.

The adhesive ply 710 couples the channeled stiffener 512 to the structural core layer 502 to provide a structural bond between the channeled stiffener 512 and the core 502.

The syntactic core 714 provides an edge transition to the leading edge of the syntactic core 714 (aero joint). The syntactic core 714 provides an edge transition to a forward edge of the structural sandwich panel 700 (forward edge interfaces with the leading edge panel).

Figure 7A:
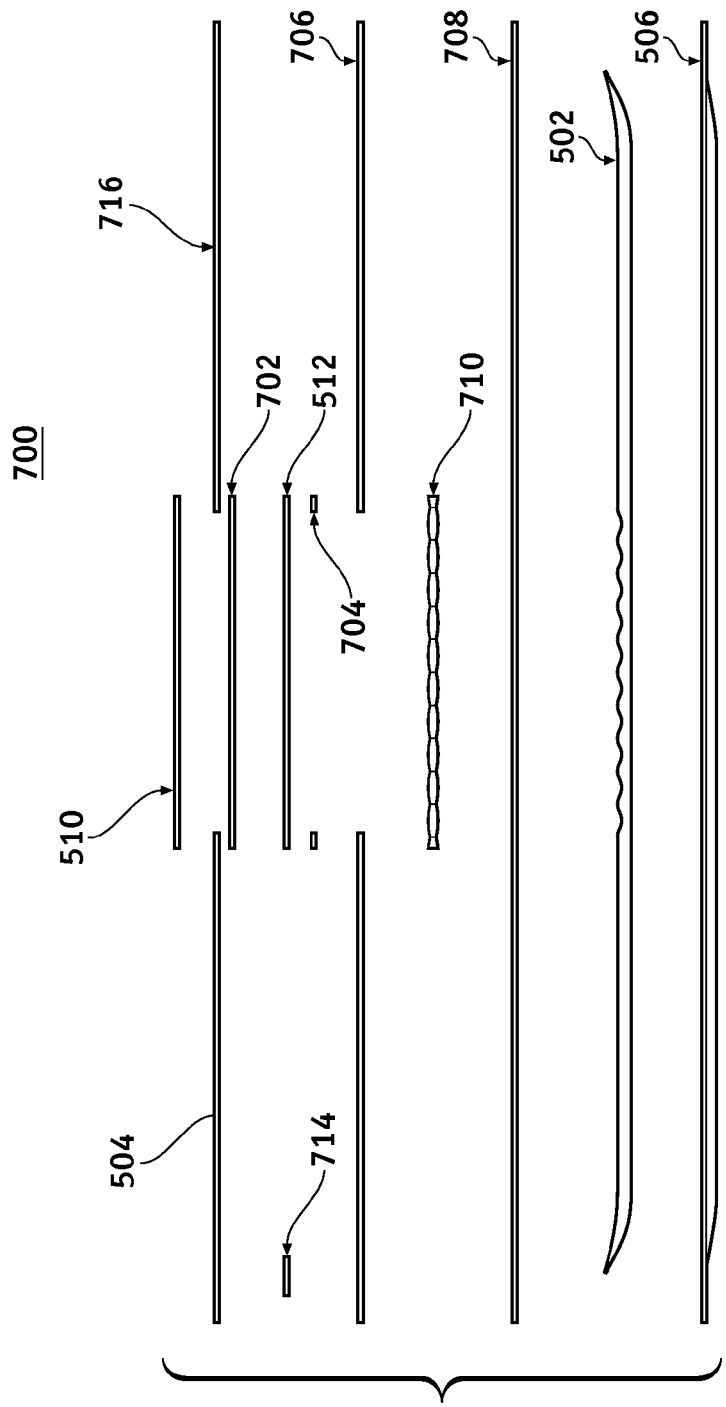
FIG. 7A is an illustration of an extended 2D end-view of the structural sandwich panel assembly of FIG. 7 according to an embodiment of the disclosure.

FIG. 7A is an illustration of an extended 2D end-view of the structural sandwich panel assembly 700 according to an embodiment of the disclosure.

FIG. 8 is an illustration of a back side panel 806 (interior backing facesheet 506) of the secondary suction device 402 with a laminar flow control sandwich panel manifold 802 (manifold 802) integration according to an embodiment of the disclosure. The manifold 802 comprises a manifold suction port 804 that is coupled to a backside of the back side panel 806 of the secondary suction device 402. Discrete flow holes 808 are drilled into the suction channels 514 of the channeled stiffeners 512. The discrete flow holes 808 provide a suction path for a fluid flow from a front side of the perforated region 510 (FIG. 5) out through the manifold suction port 804 of the manifold 802. The manifold 802 is bonded to the backside of the back side panel 806, enshrouding the discrete flow holes 808. In this manner, the manifold 802 suitably couples the interior backing facesheet 506 to an existing hybrid laminar flow purge and suction system or to a dedicated passive suction device such as the passive suction port 406 as explained above.

Figure 9:
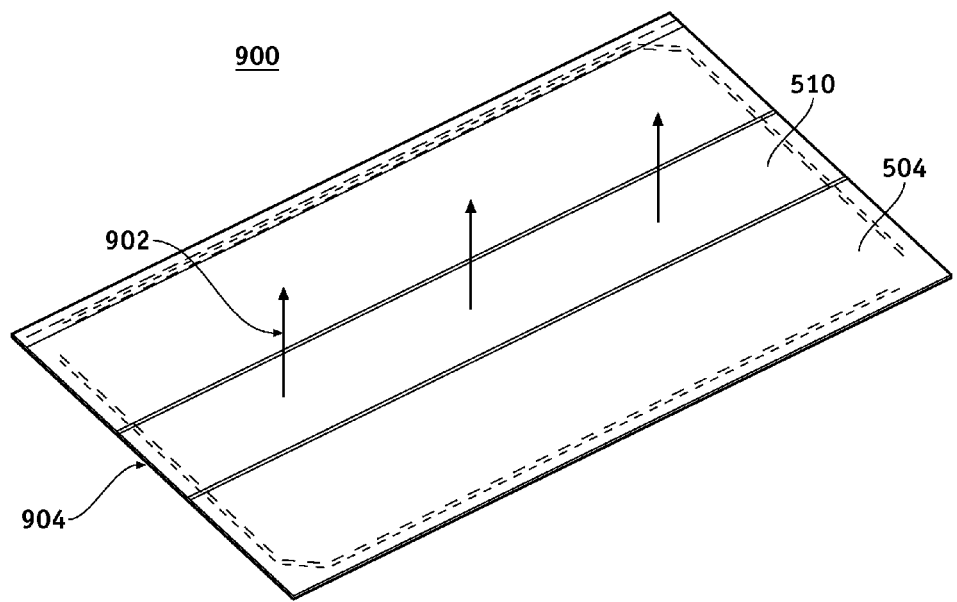
FIG. 9 is an illustration of a surface finish and paint method according to an embodiment of the disclosure.

FIG. 9 is an illustration of a surface finish and paint method of the structural sandwich panel 900 of the structural sandwich panel 404 according to an embodiment of the disclosure. The structural sandwich panel 900 is painted with a blow-back technique to achieve desired permeability and surface finish over the perforated region 510 of the secondary suction device 402 desired for laminar flow. Finished structural sandwich panel 900 outer surface such as the face-sheets 504 in the perforated region 510 is finished per standards surface preparation and painting except a small amount of back-pressure (e.g., about 5 psi) is blown back out through the channeled stiffener 512.

In this manner, a low purge pressure is applied while applying and curing finishes preventing clogging of the perforations 516 of the perforated region 510. Air flow pressure 902 is applied through the manifold 802 on the back side panel 806 of the secondary suction device 402 within the structural sandwich panel 900 and exits through the perforated region 510 to prevent hole blockage of the perforation during surface finish. In this manner, permeability and smoothness of the secondary suction device 402 is maintained, thus mitigating obstruction of the perforations 516 by paint or in-service blocking.

Figure 10:
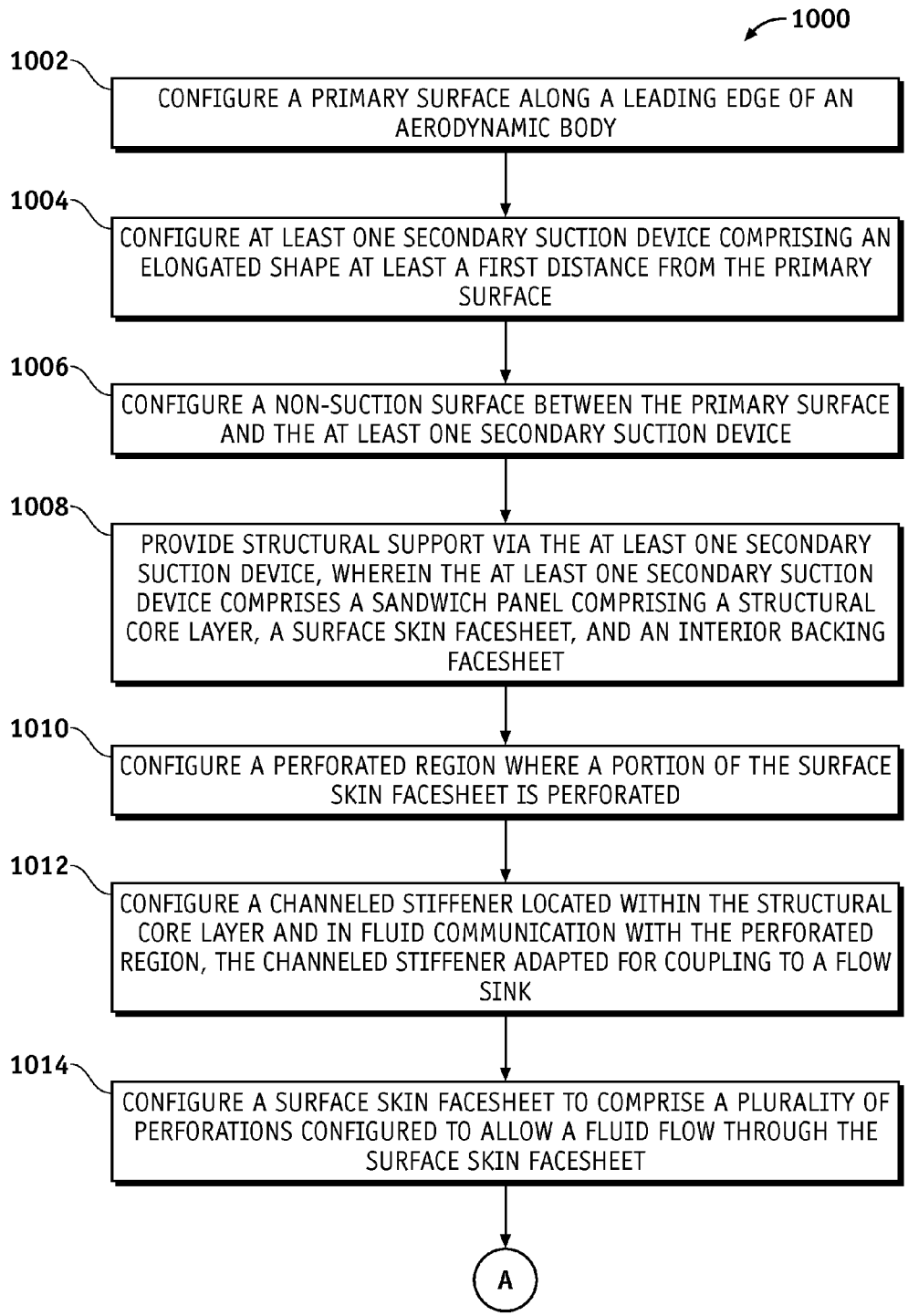
FIG. 10 is an illustration of an exemplary flowchart showing a process for secondary suctioning according to an embodiment of the disclosure.
Figure 10:
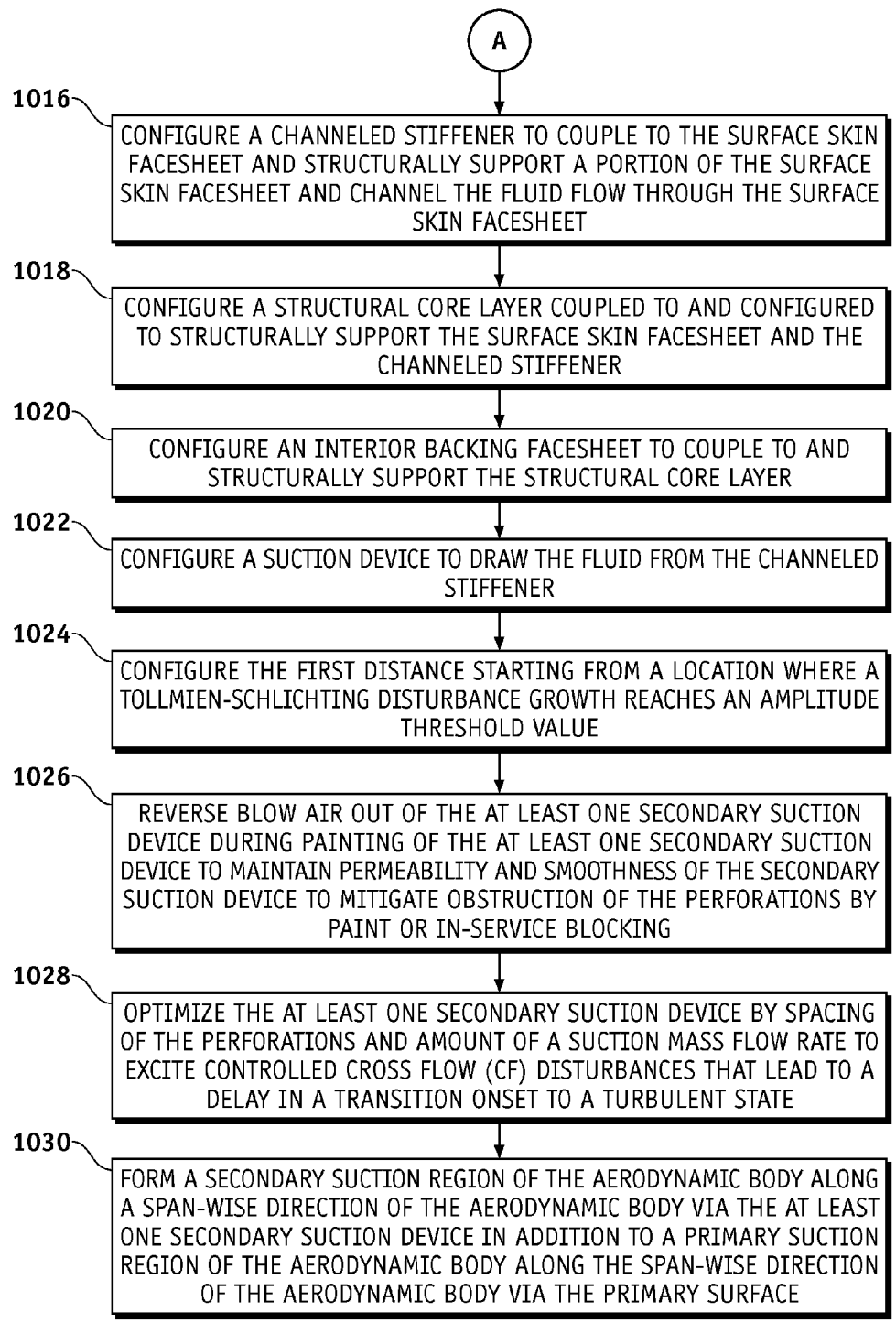

FIG. 10 is an illustration of an exemplary flowchart showing a process 1000 for applying secondary suction according to an embodiment of the disclosure. The various tasks performed in connection with process 1000 may be performed mechanically, by software, hardware, firmware, or any combination thereof. For illustrative purposes, the following description of process 1000 may refer to elements mentioned above in connection with FIGS. 1-9. In some embodiments, portions of the process 1000 may be performed by different elements of the system 500-900 such as the structural core layer 502, the surface skin facesheet 504, the interior backing facesheet 506, the manifold 802, the channeled stiffener 512, etc. Processes 1000 may have functions, material, and structures that are similar to the embodiments shown in FIGS. 1-9. Therefore common features, functions, and elements may not be redundantly described here.

Process 1000 may begin by configuring a primary surface along a leading edge of an aerodynamic body (task 1002). Suction control (also referred to as suction) may be applied over the primary surface 408 to provide a hybrid laminar flow control yielding the primary suction region 304. Alternatively, no suction control may be applied over the primary surface 408 (FIG. 11) yielding a natural laminar flow control. In this manner, the primary surface 408, may comprise for example but without limitation, a suction control surface, a hybrid laminar flow suction control surface, a natural laminar flow control surface, or other surface or region suitable for providing a leading edge laminar boundary layer for reducing turbulent flow over the primary surface 408.

Process 1000 may continue by configuring at least one secondary suction device comprising an elongated shape at least a first distance from the primary surface (task 1004).

Process 1000 may continue by configuring a non-suction surface between the primary surface and the at least one secondary suction device (task 1006).

Process 1000 may continue by providing structural support via the at least one secondary suction device, wherein the at least one secondary suction device comprises a sandwich panel comprising a structural core layer, a surface skin facesheet, and an interior backing facesheet (task 1008).

Process 1000 may continue by configuring a perforated region where a portion of the surface skin facesheet is perforated (task 1010).

Process 1000 may continue by configuring a channeled stiffener located within the structural core layer and in fluid communication with the perforated region, the channeled stiffener adapted for coupling to a flow sink (task 1012).

Process 1000 may continue by configuring a surface skin facesheet to comprise a plurality of perforations configured to allow a fluid flow through the surface skin facesheet (task 1014).

Process 1000 may continue by configuring a channeled stiffener to couple to the surface skin facesheet and structurally support a portion of the surface skin facesheet and channel the fluid flow through the surface skin facesheet (task 1016).

Process 1000 may continue by configuring a structural core layer coupled to and configured to structurally support the surface skin facesheet and the channeled stiffener (task 1018).

Process 1000 may continue configuring an interior backing facesheet to couple to and structurally support the structural core layer (task 1020).

Process 1000 may continue by configuring a suction device to draw the fluid from the channeled stiffener (task 1022).

Process 1000 may continue by configuring the first distance starting from a location where a Tollmien-Schlichting disturbance growth reaches an amplitude threshold value (task 1024). The amplitude threshold value may be, for example but without limitation, about 25%-75% of the transition Tollmien-Schlichting disturbance value 334.

Process 1000 may continue by reverse blowing air out of the at least one secondary suction device during painting of the at least one secondary suction device to maintain permeability and smoothness of the secondary suction device to mitigate obstruction of the perforations by paint or in-service blocking (task 1026).

Process 1000 may continue by optimizing the at least one secondary suction device by spacing of the perforations and amount of a suction mass flow rate to excite controlled cross flow (CF) disturbances that lead to a delay in a transition onset to a turbulent state (task 1028).

Process 1000 may continue by forming a secondary suction region of the aerodynamic body along a span-wise direction of the aerodynamic body via the at least one secondary suction device in addition to a primary suction region of the aerodynamic body along the span-wise direction of the aerodynamic body via the primary surface (task 1030).

FIG. 11 is an illustration of a smaller size wing 1100 showing an extended suction device 402 integrated aft of a leading edge into structural sandwich panels thereof according to an embodiment of the disclosure. For the smaller size wing 1100, the extended suction device 402 for forming the secondary suction region 306 may be more viable than the primary laminar flow surface 408 for forming the primary suction region 304. For a smaller sized wing, the primary laminar flow surface 408 for forming the primary suction region 304 may not be needed. Thus in this example, the primary laminar flow surface 408 without suction control may be used for a natural laminar flow control in addition to the extended suction device 402. Multiple extended suction devices 402 may be used.

FIG. 12 is an illustration of a large size wing 1200 showing multiple extended suction device 402 integrated aft of a leading edge into structural sandwich panels thereof according to an embodiment of the disclosure. The primary laminar flow surface 408 may be located, for example but without limitation, from the leading edge to about 3-4% of the chord line from the leading edge of the wing 1200, or other location on the wing 1200 suitable for operation of the extended suction device 402. The extended suction device 402 may be, for example but without limitation, about 25 cm (about 10 inches) wide, or other width suitable for operation of the extended suction device 402. The extended suction device 402, may be, for example but without limitation, located in a wing box of the wing 1200 forward of the front spar.

Each of the extended suction device 402 may have the suction mass flow rate 336 (FIG. 3C) of, for example but without limitation, about 20% of the primary suction mass flow 326 of the primary laminar flow surface 408, or other suction mass flow level suitable for operation of the extended suction device 402. The extended suction device 402 may add, for example but without limitation, about 20% more laminar flow in this example.

FIG. 13 is an illustration of a fuselage 1300 showing multiple extended suction device 402 integrated into structural sandwich panels thereof according to an embodiment of the disclosure. The extended suction device 402 are used to control the Tollmien-Schlichting disturbances 340 (FIG. 3C), each of the extended suction device 402 may begin when the Tollmien-Schlichting disturbances 340 reaches the amplitude threshold value 332 (FIG. 3C).

Figure 14:
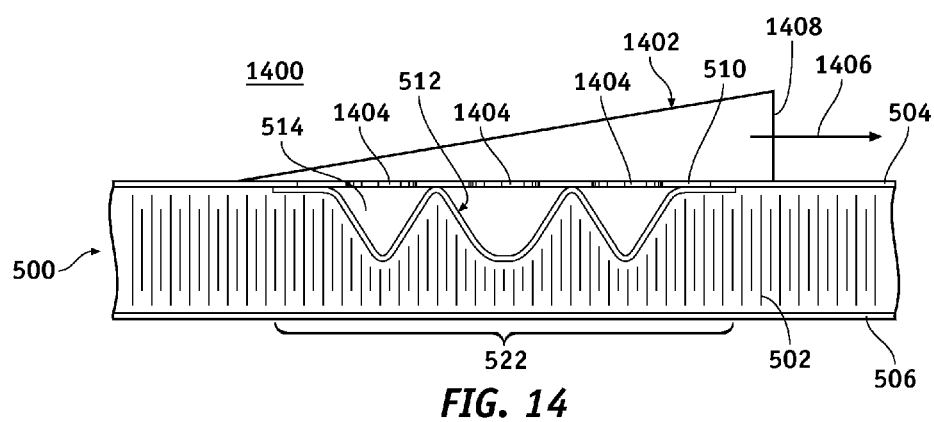
FIGS. 14-16 are illustrations showing configurations comprising an aft-facing-scupper passive suction source for low-pressure according to an embodiment of the disclosure.
Figure 15:
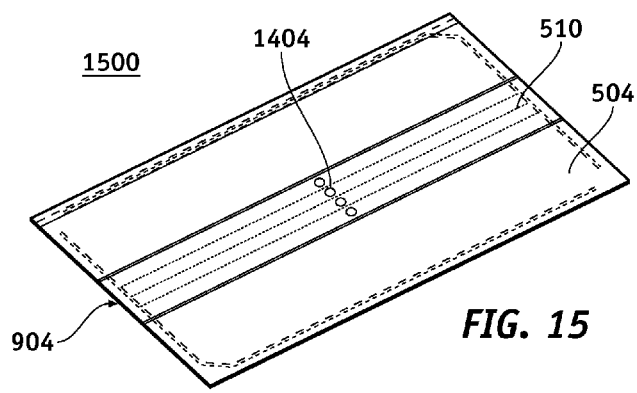
Figure 16:
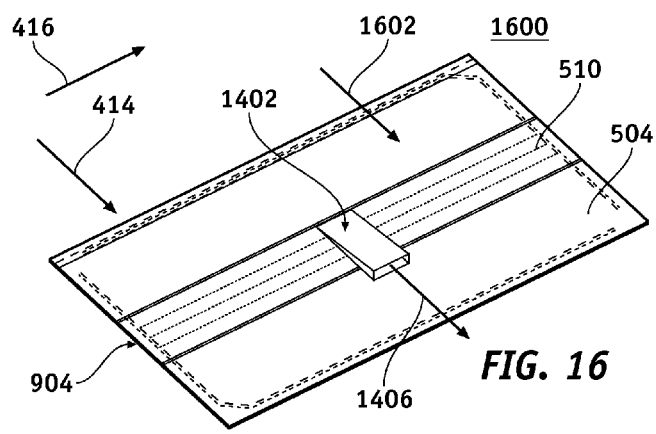

FIGS. 14-16 are illustrations showing configurations 1400-1600 comprising the aft-facing-scupper passive suction source 1402 for low-pressure according to an embodiment of the disclosure. The aft-facing-scupper passive suction source 1402 is configured to provide an aft-facing passive suction to evacuate the suctioned fluid from the suction channels 514 of the channeled stiffener 512. The aft-facing-scupper passive suction source 1402 is directly coupled to the surface skin facesheet 504, and for example but without limitation, the interior backing facesheet 506 of the suctioning system 500. In this manner, the aft-facing-scupper passive suction source 1402 provides a self-contained source for low-pressure to service a panel of certain size. As mentioned above, the aft-facing-scupper passive suction source 1402 eliminates a need to couple the panels 504/506 of the suctioning system 500 pneumatically to the low-pressure suction source 406, reducing weight and facilitating retrofit of existing panels.

The aft-facing-scupper passive-suction source 1402 is a fixed (non-moving) passive suction device. Thus, a fixed aft-facing-scupper passive suction source 1402 and an aft-scupper passive suction source 1402 may be used interchangeably in this document. The fixed aft-facing-scupper passive-suction source 1402 may comprise, for example but without limitation, a wedge shape, or other suitable shape with an open exit face 1408 for suction air 1406 to be sucked out passively.

Local openings 1404 in the perforated region 510 are configured to evacuate the suction air 1406 from each of the suction channels 514 of the channeled stiffener 512. Each of the suction channels 514 may comprise its own opening 1404. Alternatively, the suction channels 514 may be coupled to a substructure to reduce a number of local openings 1404 (orifices) to evacuate the suction air 1406 and thus reduce a size of the fixed aft-scupper passive suction source 1402 in the stream-wise direction 414.

Instead of one large fixed aft-scupper passive suction source 1402 (fixed suction device) per surface area, several much smaller fixed aft-scupper passive suction sources 1402 (fixed suction devices) may be used on each surface. In this manner, each of the fixed aft-scupper passive suction sources 1402 is coupled to one span-wise segment (in a span-wise direction 416) of the surface skin facesheet 504, and the interior backing facesheet 506 of the suctioning system 500. A number of the span-wise segments depends on flow rates and size of each span-wise segment.

In this way, various embodiments of the disclosure provide a method for promoting laminar flow over a greater region of an airfoil, a fuselage, or any other fluid dynamic surface thereby reducing drag under certain operating conditions.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 4-9 and 11-16 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. An apparatus for extending laminar flow over an aerodynamic surface having a primary laminar flow region, comprising:
    a surface skin facesheet comprising a perforated region, the perforated region comprising a plurality of perforations configured to allow a flow of a fluid through the surface skin facesheet;
    a structural core layer coupled to and configured to structurally support a portion of the surface skin facesheet, wherein a portion of the structural core layer comprise flow channels spanning a thickness of the structural core layer;
    a channeled stiffener positioned between the perforated region of the surface skin facesheet and the structural core layer, wherein the channeled stiffener is configured to structurally support the surface skin facesheet and channel the flow of the fluid, wherein the channeled stiffener comprises suction channels coupled to the perforated region of the surface skin face sheet, and wherein the suction channels comprise flow holes corresponding to the flow channels;
    an interior backing facesheet coupled to and configured to structurally support the structural core layer, wherein the interior backing facesheet comprises flow holes corresponding to the flow channels; and
    a suction device located a distance aft of the primary laminar flow region and configured to draw the fluid from the channeled stiffener through the flow holes in the suction channels, the flow channels in the structural core layer, and the flow holes in the interior backing facesheet.

2. The apparatus according to claim 1, wherein the perforations comprise a substantially strip-like portion of an airfoil surface along a span-wise direction.

3. The apparatus according to claim 2, wherein the surface skin facesheet is spaced a distance at least equal to a chord width of the surface skin facesheet from a leading edge of the airfoil surface.

4. The apparatus according to claim 1, wherein the channeled stiffener encloses a volume and comprises a plurality of ribs joined to a base.

5. The apparatus according to claim 1, wherein the suction device comprises at least one fixed-aft-facing-scupper passive suction source directly coupled to the surface skin facesheet.

6. The apparatus according to claim 1, further comprising a manifold coupling the interior backing facesheet to a flow control purge and suction system or a dedicated passive suction device comprising a suction port.

7. The apparatus according to claim 1, wherein the surface skin facesheet is located at least a distance from a primary suction region, a non-suction region disposed between the surface skin facesheet and a primary suction region.

8. The apparatus according to claim 1, wherein the aerodynamic surface comprises an exterior surface of a vertical fin, a horizontal stabilizer, a wing, a winglet, a fuselage skin, a canard, an elevator, an aileron, an elevon, a flap, a slat, a rudder, or a spoiler.

9. An apparatus for extending laminar flow over an aerodynamic surface, comprising:
    a primary laminar flow surface which provides a primary laminar flow region along an airfoil surface when the airfoil surface is moving through a fluid; and
    a secondary suction device located a distance from the primary laminar flow surface such that the laminar flow along the airfoil surface is extended beyond the primary laminar flow region when the airfoil surface is moving through a fluid,
    wherein the secondary suction device is integrated into a structural sandwich panel comprising:
        a surface skin facesheet comprising a perforated region,
        a structural core layer coupled to the surface skin facesheet,
        a channeled stiffener positioned between the perforated region of the surface skin facesheet and the structural core layer, and
        an interior backing facesheet coupled to the structural core layer.

10. The apparatus of claim 9, wherein the secondary suction device is located within the primary laminar flow region.

11. The apparatus of claim 9, further comprising a non-suction region between the primary laminar flow surface and the secondary suction device.

12. The apparatus of claim 9, wherein the secondary suction device is located starting at about 14% to about 18% of a chord line from a leading edge of the aerodynamic surface.

13. The apparatus of claim 9, wherein the primary laminar flow surface is configured for natural laminar flow operation.

14. The apparatus of claim 9, wherein the primary laminar flow surface is configured for hybrid laminar flow operation including suction applied over the primary laminar flow surface to maintain laminar flow over the primary laminar flow region, the primary laminar flow region extending a distance beyond the primary laminar flow surface.

15. The apparatus of claim 14, wherein a secondary suction mass flow rate of the secondary suction device is about 10% to about 20% of a primary suction mass flow rate at the primary laminar flow surface.

16. The apparatus of claim 9, wherein the airfoil surface is an exterior surface of one of a vertical fin, a horizontal stabilizer, a wing, a winglet, or a canard.

17. The apparatus of claim 9, further comprising a suction device in fluid communication with the channeled stiffener.

18. The apparatus of claim 17, wherein the suction device includes an aftfacing-scupper passive suction source directly coupled to the surface skin facesheet.

19. The apparatus of claim 9, further comprising:
  a hybrid laminar flow purge and suction system for providing suction over the primary laminar flow surface; and
  a manifold coupled to the backing facesheet, the manifold coupling the secondary suction device to the hybrid laminar flow purge and suction system.

20. The apparatus according to claim 9, wherein an aircraft comprises the apparatus.

\* \* \* \* \*